(12) United States Patent
Abundis Vargas

(10) Patent No.: US 10,633,003 B1
(45) Date of Patent: Apr. 28, 2020

(54) METHOD, APPARATUS, AND COMPUTER READABLE MEDIUM FOR VERIFYING A SAFE VEHICLE OPERATION VIA A PORTABLE DEVICE

(71) Applicant: HERE GLOBAL B.V., Eindhoven (NL)

(72) Inventor: Lidia Alejandra Abundis Vargas, Leon (MX)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/210,780

(22) Filed: Dec. 5, 2018

(51) Int. Cl.
*B60W 40/09* (2012.01)
*G06K 9/00* (2006.01)
*G08G 1/017* (2006.01)

(52) U.S. Cl.
CPC ......... *B60W 40/09* (2013.01); *G06K 9/00664* (2013.01); *G08G 1/0175* (2013.01)

(58) Field of Classification Search
CPC ............... G06Q 40/08; G06Q 10/0635; G06Q 20/0855; G07C 5/08; G07C 5/0816; B60W 40/09; B60W 2040/0818; G06K 9/00845; G06K 9/00664; G08B 21/06; G08G 1/0175
USPC ...................................................... 340/425.5
See application file for complete search history.

(56) References Cited

U.S. PATENT DOCUMENTS

| | | | | |
|---|---|---|---|---|
| 6,098,048 A * | 8/2000 | Dashefsky | ............. | G06Q 30/02 340/438 |
| 7,268,677 B2 * | 9/2007 | Enya | ........................ | B60Q 5/00 340/384.1 |
| 8,954,340 B2 * | 2/2015 | Sanchez | ................. | G06Q 40/00 705/4 |
| 9,053,516 B2 * | 6/2015 | Stempora | ............... | G06Q 40/08 |
| 9,189,897 B1 * | 11/2015 | Stenneth | ............... | B60W 30/00 |
| 9,233,697 B2 | 1/2016 | Schoonmaker et al. | | |
| 9,633,488 B2 * | 4/2017 | Carnell | ................ | G07C 5/0825 |

(Continued)

OTHER PUBLICATIONS

Kaplan, "Here's every company developing self-driving car tech at CES 2018", posted Jan. 7, 2018, retrieved from https://www.digitaltrends.com/cars/every-company-developing-self-driving-car-tech-ces-2018/, pp. 1-5.

(Continued)

*Primary Examiner* — Eric Blount
(74) *Attorney, Agent, or Firm* — Ditthavong & Steiner, P.C.

(57) ABSTRACT

An approach is provided for verifying a safe operation of a vehicle (e.g., an autonomous vehicle) via a portable device. The approach involves initiating a capture of environmental sensor data by a user device, wherein the sensor data indicates at least a partial view of an environment around a vehicle, and wherein the user device is independent of the vehicle. The approach also involves processing the environmental sensor data to generate a digitized representation of the environment. The approach also involves calculating a predicted motion of the vehicle based on the digitized representation. The approach further involves initiating a capture of motion sensor data by the user device, wherein the motion sensor data indicates an observed motion of the vehicle. The approach further involves identifying a safe operation of the vehicle based on a comparison by the user device of the observed motion to the predicted motion of the vehicle.

20 Claims, 15 Drawing Sheets

(56) References Cited

U.S. PATENT DOCUMENTS

| | | | |
|---|---|---|---|
| 9,754,325 B1 | 9/2017 | Konrardy et al. | |
| 10,032,318 B1* | 7/2018 | Ferguson | G07C 5/0825 |
| 10,332,390 B1* | 6/2019 | Brinkmann | G06F 17/00 |
| 10,475,335 B1* | 11/2019 | Drinkwater | G08G 1/0969 |

OTHER PUBLICATIONS

"MIT 6.S094: Deep Learning for Self-Driving Cars", retrieved on Dec. 5, 2018 from https://selfdrivingcars.mit.edu/, pp. 1-5.

Shinkle et al., "Autonomous Vehicles | Self-Driving Vehicles Enacted Legislation", Nov. 7, 2018, retrieved from http://www.ncsl.org/research/transportation/autonomous-vehicles-self-driving-vehicles-enacted-legislation.aspx, pp. 1-6.

\* cited by examiner

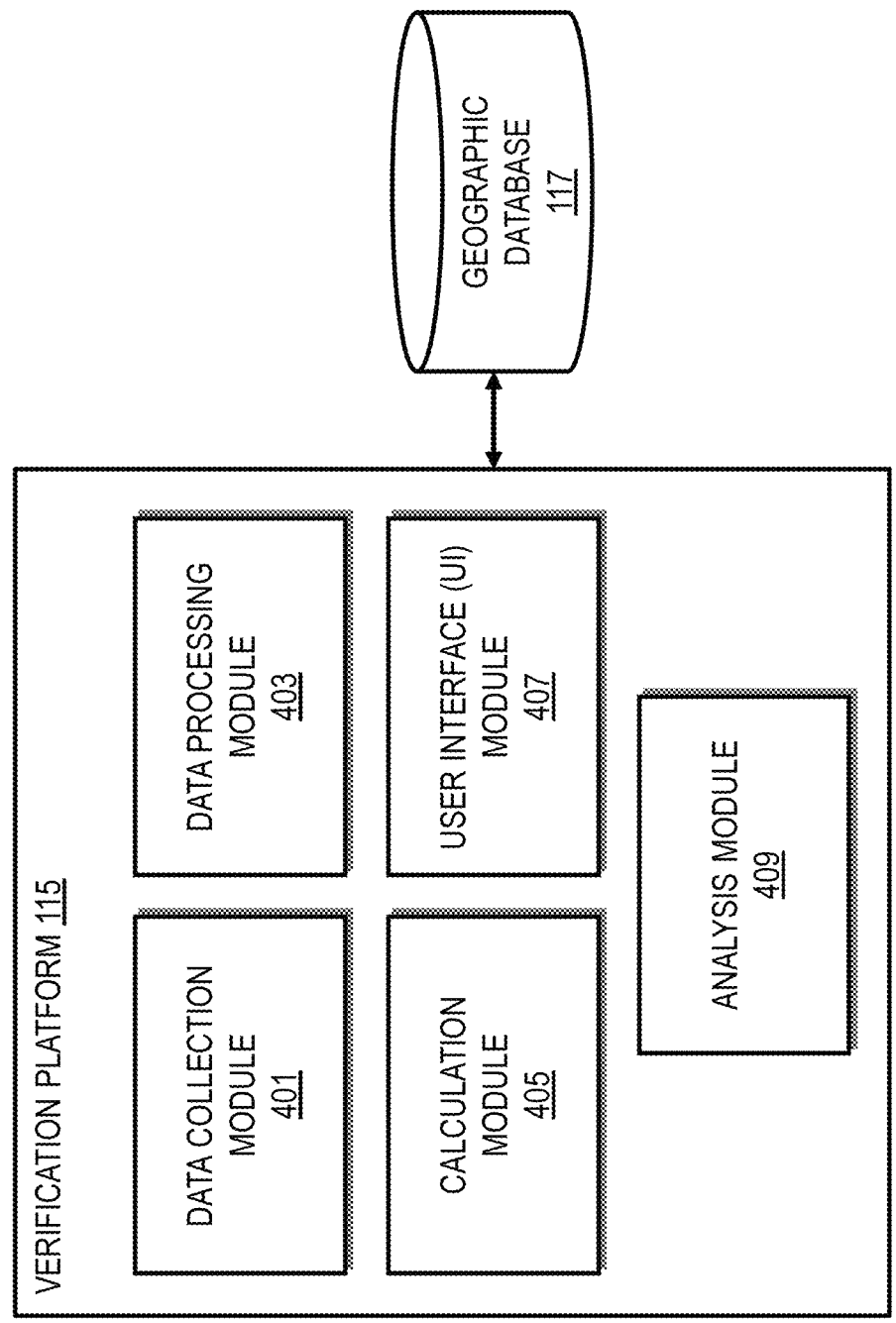

METHOD, APPARATUS, AND COMPUTER READABLE MEDIUM FOR VERIFYING A SAFE VEHICLE OPERATION VIA A PORTABLE DEVICE

BACKGROUND

Consumer confidence in the safety of modern vehicles is a growing concern particularly as vehicles become more autonomous and complex. For example, modern vehicles (e.g., autonomous, semi-autonomous, or highly assisted (HAD) vehicles) are equipped with multiple sensor arrangements that monitor the vehicle's environments, as well as the many operating parameters of the different vehicle subsystems and components. Modern vehicles such as autonomous vehicles utilize this information to make decisions when controlling a vehicle's movement. Consumer confidence is vital for the success of autonomous vehicles, particularly as a public transportation option. As time progresses, autonomous vehicle technology may be trusted to perform in a safe manner. However, trusting a single entity (i.e., an autonomous vehicle) to make safe driving decisions is currently a significant barrier for the widespread adoption of the technology. Accordingly, service providers face significant technical challenges in providing data to consumers to indicate the safe operation of autonomous vehicles.

SOME EXAMPLE EMBODIMENTS

Therefore, there is a need for an approach for providing an independent verification of a safe operation of a vehicle (e.g., an autonomous vehicle), which is accessible and transparent to a user of the vehicle (e.g., a passenger, an operator, etc.). In one embodiment, the independent verification can be provided to the user before boarding/booking the vehicle.

According to one embodiment, a computer-implemented method for verifying a safe operation of a vehicle via a user device comprises initiating a capture of environmental sensor data by the user device, wherein the sensor data indicates at least a partial view of an environment around the vehicle, and wherein the user device is independent of the vehicle. The method also comprises processing the environmental sensor data to generate a digitized representation of the environment. The method also comprises calculating a predicted motion of the vehicle based on the digitized representation. The method further comprises initiating a capture of motion sensor data by the user device, wherein the motion sensor data indicates an observed motion of the vehicle. The method further comprises identifying a safe operation of the vehicle based on a comparison by the user device of the observed motion to the predicted motion of the vehicle.

According to another embodiment, an apparatus for verifying a safe operation of a vehicle comprises at least one processor, and at least one memory including computer program code for one or more computer programs, the at least one memory and the computer program code configured to, with the at least one processor, cause, at least in part, the apparatus to initiate a capture of environmental sensor data by the apparatus, wherein the sensor data indicates at least a partial view of an environment around the vehicle, and wherein the apparatus is independent of the vehicle. The apparatus is also caused to process the environmental sensor data to generate a digitized representation of the environment. The apparatus is also caused to calculate a predicted motion of the vehicle based on the digitized representation. The apparatus is further caused to initiate a capture of motion sensor data by the apparatus, wherein the motion sensor data indicates an observed motion of the vehicle. The apparatus if further caused to identify a safe operation of the vehicle based on a comparison of the observed motion to the predicted motion of the vehicle.

According to another embodiment, a non-transitory computer-readable storage medium for verifying a safe operation of a vehicle carries one or more sequences of one or more instructions which, when executed by one or more processors, cause, at least in part, an apparatus to initiating a capture of environmental sensor data by the apparatus, wherein the sensor data indicates at least a partial view of an environment around a vehicle, and wherein the apparatus is independent of the vehicle. The apparatus is also caused to processing the environmental sensor data to generate a digitized representation of the environment. The apparatus is also caused to calculating a predicted motion of the vehicle based on the digitized representation. The apparatus is further caused to initiating a capture of motion sensor data by the apparatus, wherein the motion sensor data indicates an observed motion of the vehicle. The apparatus is further caused to identifying a safe operation of the vehicle based on a comparison of the observed motion to the predicted motion of the vehicle.

According to another embodiment, an apparatus for verifying a safe operation of a vehicle via a user device comprises means for initiating a capture of environmental sensor data by the user device, wherein the sensor data indicates at least a partial view of an environment around the vehicle, and wherein the user device is independent of the vehicle. The apparatus also comprises means for processing the environmental sensor data to generate a digitized representation of the environment. The apparatus also comprises means for calculating a predicted motion of the vehicle based on the digitized representation. The apparatus further comprises means for initiating a capture of motion sensor data by the user device, wherein the motion sensor data indicates an observed motion of the vehicle. The apparatus further comprises means for identifying a safe operation of the vehicle based on a comparison by the user device of the observed motion to the predicted motion of the vehicle.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a diagram of components of a verification platform capable of verifying a safe operation of a vehicle via a portable device, according to one embodiment;

DESCRIPTION OF SOME EMBODIMENTS

Examples of a method, apparatus, and computer program for verifying a safe operation of a vehicle via a portable device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
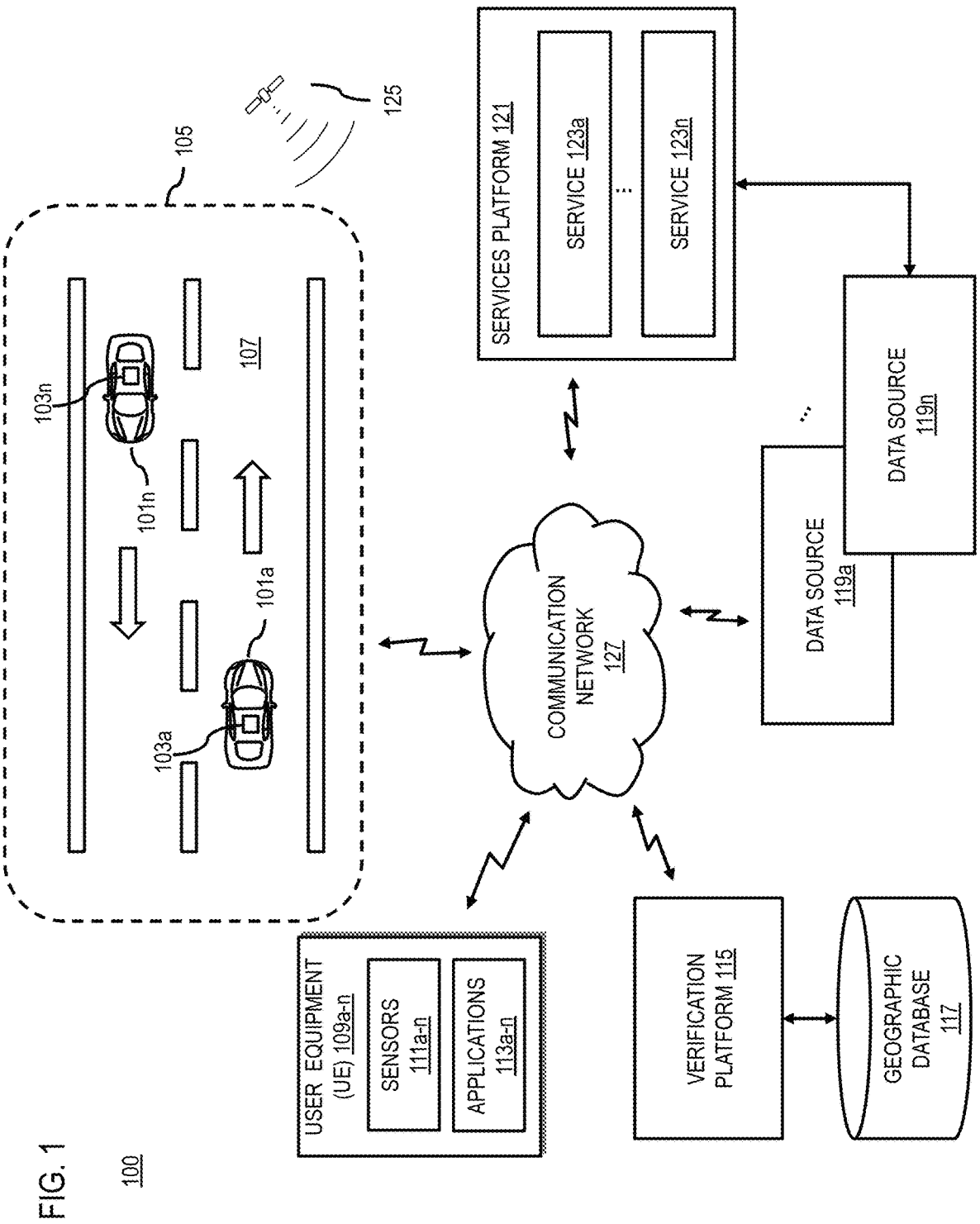
FIG. 1 is a diagram of a system capable of verifying a safe operation of a vehicle (e.g., an autonomous vehicle) via a portable device (e.g., a smartphone), according to one embodiment.

FIG. 1 is a diagram of a system capable of verifying a safe operation of a vehicle (e.g., an autonomous vehicle, a semi-autonomous vehicle, or a HAD vehicle) via a portable device (e.g., a mobile device, a smartphone, etc.), according to one embodiment. Modern vehicles, in particular autonomous or semi-autonomous vehicles, are often equipped with various sensors that monitor the vehicle's environment, as well as the many operating parameters of the different vehicle subsystems and components (e.g., vehicle safety systems). In addition, many modern vehicles can maintain operation logs, keep track of their own service appointments, detect dangerous/critical safety conditions, and even record if an accident or other safety incident has occurred. For example, as a modern vehicle (e.g., an autonomous vehicle) operates or travels on a road network, the vehicle subsystems, sensors, software, and/or other components of the vehicle can become worn, damaged, broken, or malfunction due to, but not limited to, environmental conditions, lack of proper maintenance, and so forth. As critical vehicle functions (e.g., safety functions, fuel or power efficiency functions, autonomous or semi-autonomous driving functions, etc.) become more dependent on these subsystems and components, verifying that the vehicle continues to perform in a safe manner, and therefore, can be trusted by a user or passenger becomes more important.

For example, autonomous vehicles are starting to operate on public roads, mostly on trial basis (e.g., at the time of this patent application filing). While a truly autonomous vehicle (e.g., National Highway Traffic Safety Administration (NHTSA) autonomous level 4 or 5) is not yet available for consumers to purchase, trials have taken place where autonomous vehicles provide a taxi-like service to members of the public. Only a few providers have offered the option until now, and they have done so with an accompanying highly trained technician or engineer on board. Such an individual is there to monitor and review the vehicle's actions as it moves through the streets, in order to figure out if the vehicle is misinterpreting the situation. However, this will not be the case when only passengers board such a vehicle.

Consumer confidence is vital for the success of autonomous vehicles particularly as a public transportation option. As time progresses, autonomous vehicle technology will be inherently trusted to perform in a safe manner. One way to garner such trust is through independent verification of an autonomous vehicle's consistent performance in a predictable manner (e.g., operating in a safe manner). Also, as with human drivers, there may be situations when an autonomous vehicle misinterprets the environment. Consumer confidence or trust may be increased when these instances are verified (e.g., to avoid outliers) and made accessible to potential users and/or passengers alike. Accordingly, service providers face significant technical challenges to independently (e.g., independent with respect to the assessed vehicle or its systems) assess and then present this assessment to users.

To address these challenges, a system 100 of FIG. 1 introduces a capability to independently verify a safe operation of a vehicle (e.g., an autonomous, a semi-autonomous, or a HAD vehicle) via a portable device (e.g., mobile device, a smartphone, etc.), according to one embodiment. As shown in FIG. 1, the system 100 comprises one or more vehicles 101a-101n (also collectively referred to herein as vehicles 101) configured with one or more vehicle sensors 103a-103n (also collectively referred to herein as vehicle sensors 103). In one embodiment, the vehicles 101 are autonomous vehicles, semi-autonomous vehicles, or HAD vehicles that can sense their environments and navigate within a travel network 105 without driver or occupant input via the vehicle sensors 103. In one embodiment, the vehicle sensors 103 (e.g., camera sensors, light sensors, global position system (GPS) sensors, light detection and ranging (LIDAR) sensors, RADAR, infrared sensors, thermal sensors, and the like) acquire contextual data about the surrounding environment during an operation of the vehicle 101 along one or more roads 107 within the travel network 105.

In one embodiment, a vehicle 101 (e.g., an autonomous vehicle) is equipped with multiple sensor 103 components that enable the vehicle 101 to assemble a digitized representation of its environment (e.g., using Sensor Fusion technology). In one instance, different sensors 303 (e.g., image sensors, radar sensors, and LIDAR sensors) may be arranged on different areas of a vehicle 101. Sensor fusion, in one example, may provide a digital understanding of the vehicle 101's environment and enable different algorithms to issue control commands to a vehicle 101's subsystems (e.g., powertrain, brakes, steering, suspension, etc.). However, the very complex inner workings of an autonomous vehicle 101 are often hidden from a user and possibly, if constructed around a neural network paradigm, even unintelligible to the vehicle 101's manufacturer or operator. In other words, it may not be possible for a user or passenger of a vehicle 101 to know what the vehicle 101 has sensed and why it decided to act or maneuver as it did.

In one embodiment, the concept of independent vehicle action verification by the system 100 requires that a portable device (e.g., a mobile device, a smart phone, etc.) have at least a partial view of the environment around a vehicle 101. Consequently, in one embodiment, one or more user equipment (UE) 109a-109n (also collectively referred to herein as UEs 109) (e.g., a mobile device, a smartphone, etc.) can be associated with any of the types of vehicles 101 or a person or thing traveling within a vehicle 101. In one embodiment, the UEs 109 include one or more device sensors 111a-111n (also collectively referred to herein as device sensors 111) (e.g., a front facing camera, a rear facing camera, GPS sensors, multi-axial accelerometers, height sensors, tilt sensors, moisture sensors, pressure sensors, etc.) and one or more applications 113a-113n (also collectively referred to herein as applications 113)(e.g., a mapping application, a navigation application, a parking application, a diagnostic application, etc.).

In one embodiment, a user can mount a UE 109 (e.g., a smartphone) in a vehicle 101 (e.g., an autonomous vehicle) in such a way that the main camera of the UE 109 (e.g., a rear-facing camera 111) is mounted with a forward-facing view of a road 107. For example, in one instance, a UE 109 may be mounted on the windshield of an autonomous vehicle 101. As UEs 109 become more sophisticated, additional device sensors 111 may contribute to the system 100 having a better understanding of the environment around an autonomous vehicle 101. For instance, combining front and rear cameras 111 can provide a UE 109 an almost 360° view from inside of a vehicle 101. Although a passenger and/or a portion of a vehicle 101 structure may obstruct a portion of the UE 109's view in some instances; it is contemplated that there would still be enough images to provide the system 100 relevant information about the vehicle 101's external environment. In one embodiment, the device sensors 111 may include RADAR sensors, LIDAR sensors, and other similar sensors which can help the system 100 complete the environment overview around a vehicle 101.

Figure 2A:
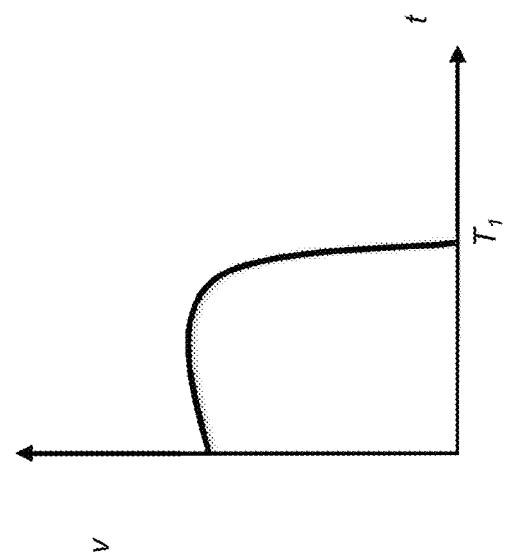
FIGS. 2A-2C are diagrams of example motion profiles of a vehicle predicted and detected on a portable device, respectively.
Figure 2B:
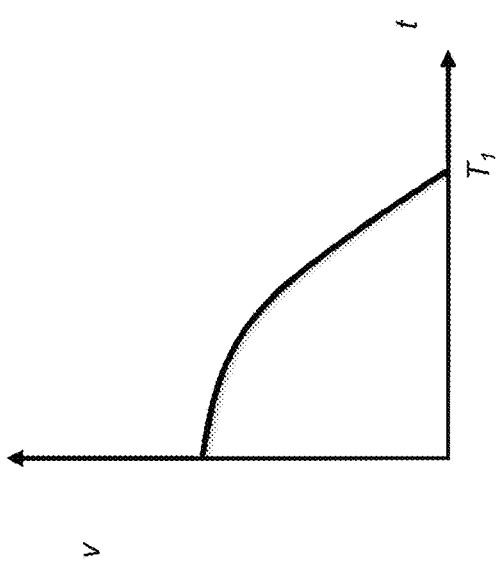
Figure 2C:
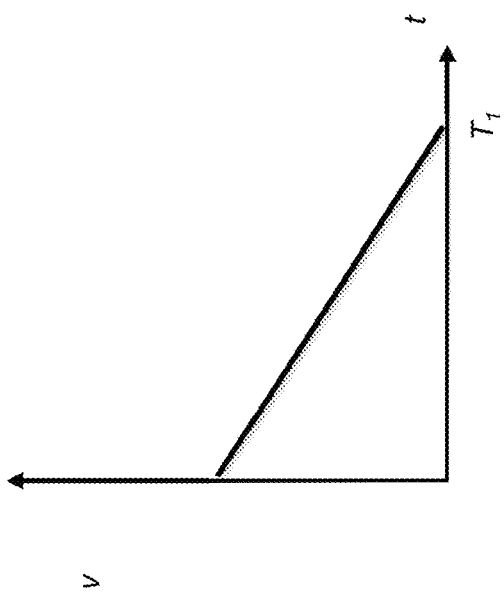

FIGS. 2A-2C are diagrams of example motion profiles of a vehicle predicted and detected on a portable device, respectively. As shown, the y-axis represents the velocity (v) of a vehicle 101 (e.g., an autonomous vehicle) and the x-axis represents time (t). In this example, a vehicle 101 is approaching an intersection where a traffic light has turned red. In one embodiment, a UE 109 (e.g., a mobile device attached to the windshield of the vehicle 101) detects the red light and computes (predicts) that the vehicle 101 will deaccelerate and stop in a steady manner, as depicted in FIG. 2A. For example, at t=0, the detection of the traffic light by the vehicle 101 occurs. Consequently, at $T_1$, the UE 109 predicts that the vehicle 101 will stop. In this example, the UE 109 can also detect the motion profile of the vehicle 101 between t=0 and $T_1$, as depicted in FIG. 2B. In other words, FIG. 2B represents the observed movement of the vehicle 101 between t=0 and $T_1$. While there may be differences between the predicted motion profile and the detected motion profile, FIGS. 2A and 2B, respectively, the system 100 can determine that the vehicle 101 operated as expected and/or within a tolerance range (e.g., a safety tolerance). In comparison, if the vehicle 101 had failed to detect the traffic light at t=0, the detected motion profile may have been different. For example, the detected motion profile of FIG. 2C represents a significant deviation relative to the predicted motion profile of FIG. 2A, which indicates to the system 100 a very late braking maneuver or even a crash by the vehicle 101. In one embodiment, such incidents would be reported by the UE 109 (e.g., to a manufacturer) as a safety-critical event that the vehicle 101 may have missed.

Figure 3B:
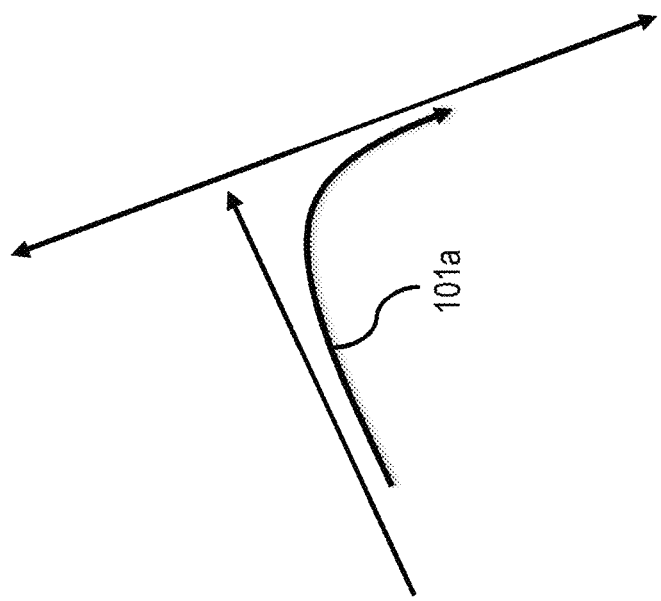
FIGS. 3A and 3B are diagrams of a road on an up-to-date map and a motion profile of a vehicle driving on the road detected on a portable device, respectively.
Figure 3A:
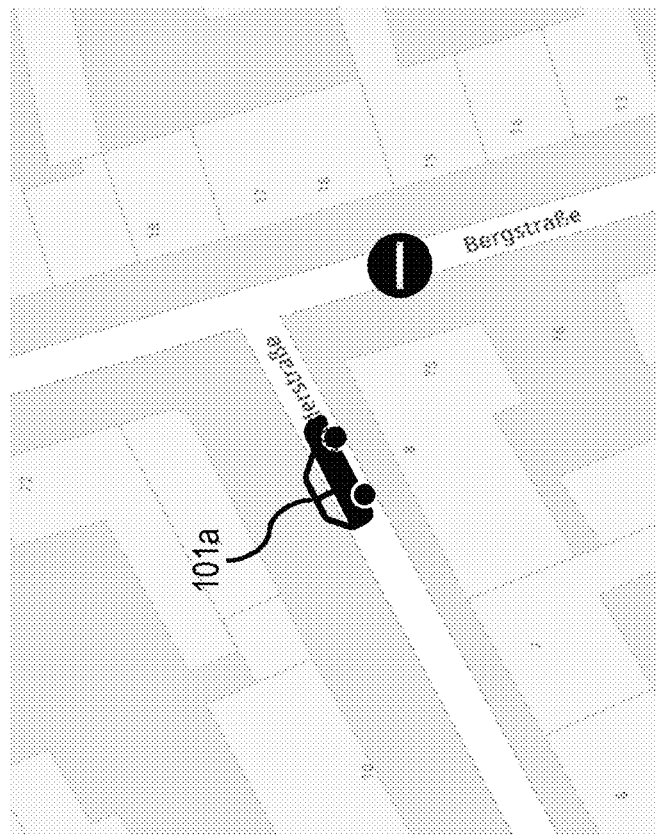

FIGS. 3A and 3B are diagrams of a road on an up-to-date map and a motion profile of a vehicle driving on the road detected on a portable device, respectively. While the example of FIGS. 2A-2C refer to braking, there may be additional scenarios detected by the system 100. For instance, a UE 109 (e.g., a mobile device) may have access to a more detailed, more up-to-date map than the autonomous vehicle 101 (e.g., via a mapping/navigation application 113), and thus recognize that some potential maneuvers may be illegal. For example, one such illegal maneuver would be a right turn by the vehicle 101, as depicted in FIG.

3A. Despite the restricted route, a UE 109 may still detect a motion profile of the vehicle 101 that is consistent with the illegal right turn, as depicted in FIG. 3B (i.e., an unsafe vehicle operation). In one embodiment, such illegal maneuvers may be identified and flagged by a UE 109. Similarly, a UE 109 (e.g., a smartphone) may pick up an autonomous vehicle 101 driving over road margins, failing to keep in lanes, ignoring traffic signals, failing to react to dangerous behavior by other road users, etc., all examples of a vehicle 101 not operating as expected and/or outside of a tolerance range (e.g., a safety tolerance). In one instance, in case of an emergency, a UE 109 may provide a warning to the vehicle 101, causing the vehicle 101 to reassess the situation or even overriding the vehicle 101 (e.g., causing it to safely stop roadside).

In one embodiment, a UE 109 can gain an understanding of the environment surrounding a vehicle 101 (e.g., using computer vision), calculate an appropriate action for the vehicle 101 given the situation, and verify if the action taken by the vehicle 101 is in accordance with the calculated maneuver. While a vehicle 101 may be equipped with higher grade sensors (e.g., sensors 103) which can provide a superior understanding of the environment, some decisive situations may be still understood by the sensors 111 of a UE 109 and/or the processing of the UE 109. Such instances or events may be flagged as safety concerns by a UE 109.

In one embodiment, the verification platform 115 collects safety-critical events or safety concerns for a vehicle 101 from multiple users (e.g., via UEs 109) and stores such instances or events in a database (e.g., the geographic database 117). In one instance, the verification platform 115 can collect and/or store the flagged instances or events based on one or more unique identifying features of the vehicle 101 such as, but not limited to, a license plate number, a service provider name plus a vehicle identification number (VIN) or one or more unique visible features (e.g., a logo, a sticker, a marking, etc.), an internet protocol (IP) address for the vehicle 101, network adapter media access control (MAC) address(es)(for electronic communications), etc. In one embodiment, the verification platform 115 can convert the aggregated assessments into a metric or a rating for a vehicle 101 to provide a subsequent user of the vehicle 101 an aggregated assessment of the vehicle's operational safety (e.g., via a UE 109) prior to the user boarding/booking the vehicle 101. In one instance, the system 100 can make available to the user (e.g., via a UE 109) a metric of which vehicles 101 perform better in critical situations to assist the user in selecting a vehicle 101 for a ride service (e.g., an autonomous taxi service). In one embodiment, the system 100 can coordinate such events across multiple vehicles 101 and/or multiple fleets of vehicles 101. In one instance, the metrics would be kept (e.g., in the geographic database 117) by an independent party (e.g., a data source 119), minimizing the risk of manipulation by the vehicle 101's manufacturer or operator.

FIG. 4 is a diagram of the components of the verification platform 115 capable of verifying a safe operation of a vehicle via a portable device, according to one embodiment. By way of example, the verification platform 115 includes one or more components for verifying a safe operation of a vehicle 101 (e.g., an autonomous vehicle) via a portable device (e.g., a UE 109). It is contemplated that the functions of these components may be combined in one or more components or performed by other components of equivalent functionality. In this embodiment, the verification platform 115 includes a data collection module 401, a data processing module 403, a calculation module 405, a user interface (UI) module 407, and an analysis module 409. In addition, the verification platform 115, a vehicle 101, and/or an application 113 executing on a UE 109 can include algorithms for processing the motion data of the vehicle 101 alone or in combination with the other modules described herein. The above presented modules and components of the verification platform 115 can be implemented in hardware, firmware, software, or a combination thereof. Though depicted as a separate entity in FIG. 1, it is contemplated that the verification platform 115 may be implemented as a module of any other component of the system 100 (e.g., a component of the services platform 121, services 123a-123n (also collectively referred to as services 123), a UE 109, an application 113, etc. In another embodiment, one or more of the modules 401-409 may be implemented as a cloud-based service, local service, native application, or combination thereof. The functions of the verification platform 115 and the modules 401-409 are discussed with respect to FIGS. 5-7 below.

Figure 5:
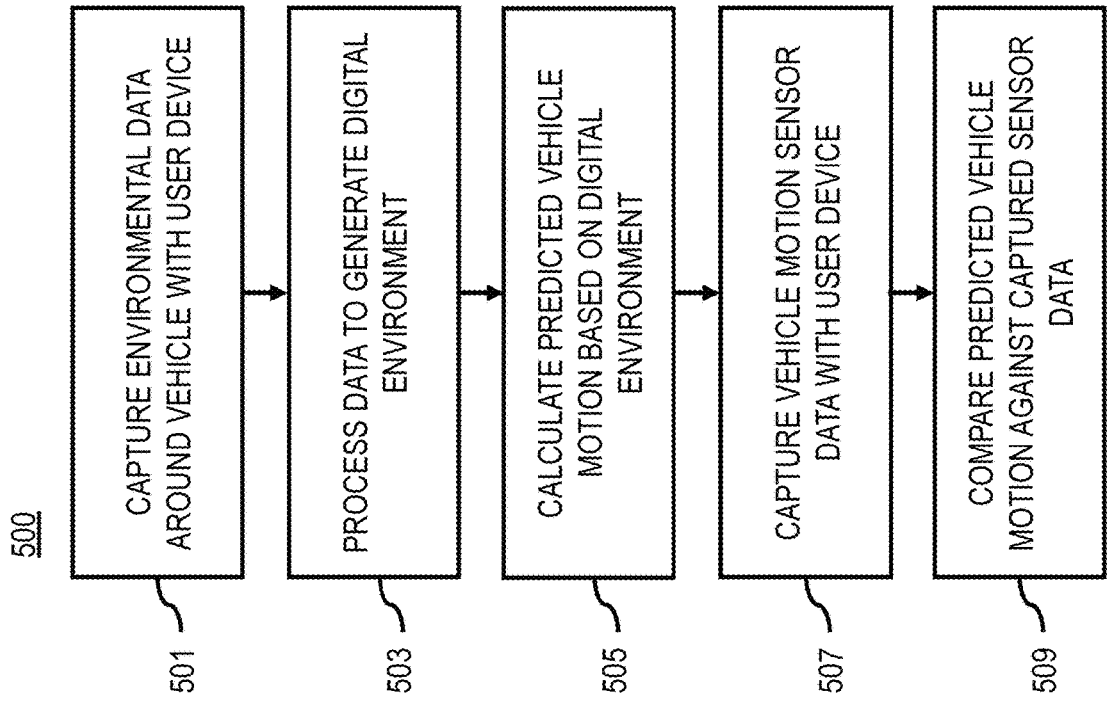
FIG. 5 is a flowchart of a process for verifying a safe operation of a vehicle via a portable device, according to one embodiment.
Figure 12:
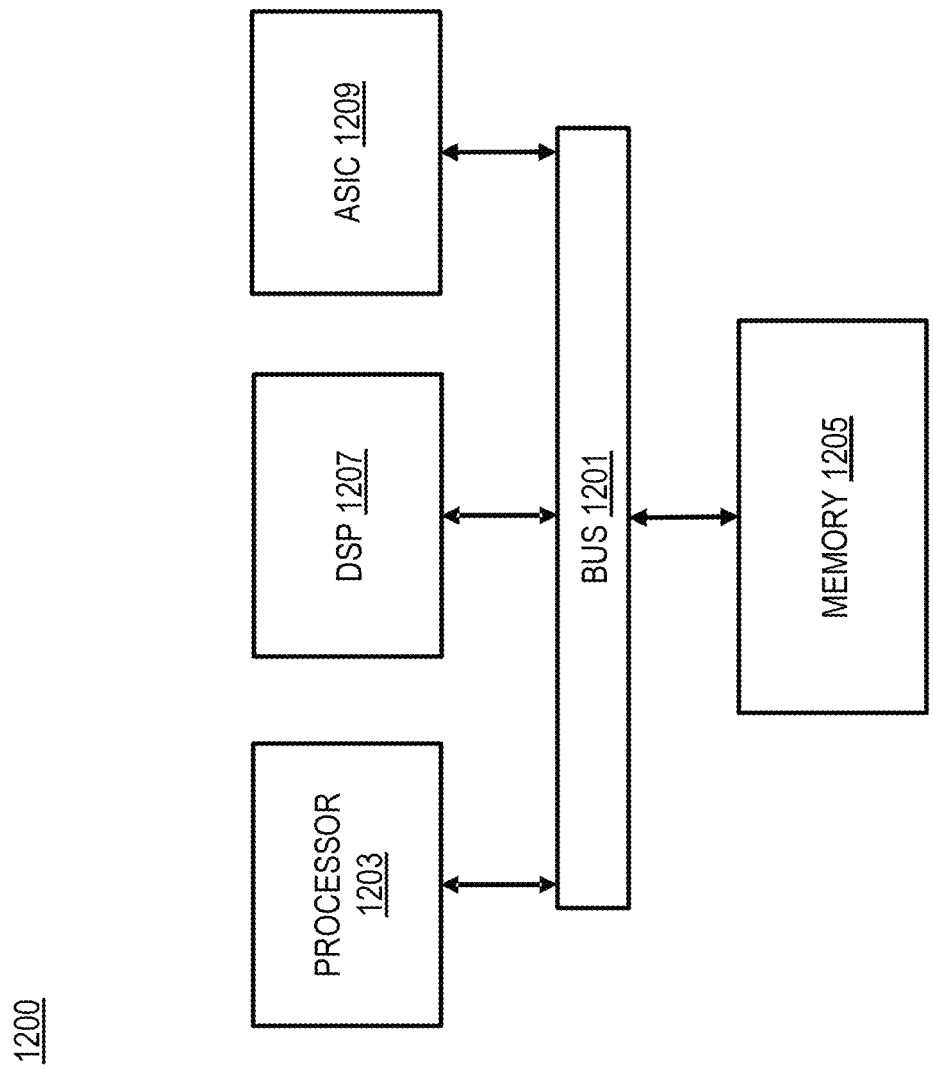
FIG. 12 is a diagram of a chip set that can be used to implement an embodiment.

FIG. 5 is a flowchart of a process 500 for verifying a safe operation of a vehicle via a portable device, according to one embodiment. In various embodiments, the verification platform 115 and/or the modules 401-409 may perform one or more portions of the process 500 and may be implemented in, for instance, a chip set including a processor and a memory as shown in FIG. 12. As such, the verification platform 115 and/or any of the modules 401-409, can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In one embodiment, the operation of the process 500 can be summarized as follows:

Capture environmental sensor data around a vehicle by a user device (step 501);

Process the data to generate a digitized environment (step 503);

Calculate a predicted motion of the vehicle based on the digitized environment (step 505);

Capture vehicle motion sensor data with a user device (step 507); and

Compare the predicted vehicle motion against the captured vehicle motion sensor data to assess an operation of the vehicle (step 509).

Embodiments of the process 500 are described below.

In step 501, the data collection module 401 initiates a capture of environmental sensor data by a user device (e.g., a mobile device, a smartphone, etc.), wherein the sensor data indicates at least a partial view of an environment around a vehicle, and wherein the user device is independent of the vehicle. In one embodiment, the environmental sensor data includes image data captured from an image sensor of a user device (e.g., a front-facing camera sensor 111, a rear-facing camera sensor 111, or a combination thereof), an entity external to the vehicle, or a combination thereof. In one instance, the data collection module 401 can combine the front and rear image sensors 111 of a UE 109 (e.g., a smartphone) to capture an almost 360° view of the environment around a vehicle 101. In one embodiment, the image data may be comprised of one or more still images, one or more videos or video sequences, or a combination thereof. By way of example, an external entity may be a device such as a traffic camera, a vehicle sensor 103 of another vehicle 101, a device sensor 111 of another UE 109, etc. In one instance, the data collection module 401 may be able to collect image data from a satellite 125. In another instance, the data collection module 401 may be able to collect image data from a service 123 (e.g., a social media service). For example, the data collection module 401 may be able to collect image data from a social media service or a user when one or more images are provided or posted with metadata (e.g., geodata) that is within a threshold of spatial accuracy and such images or videos are posted in real time or substantially real time.

In one embodiment, the vehicle 101 is an autonomous vehicle, wherein the user device (e.g., UE 109) is carried by a passenger of the autonomous vehicle 101 and is mounted to the autonomous vehicle 101 (e.g., on the windshield) during a trip by the passenger. In another instance, the vehicle 101 may be a semi-autonomous vehicle, a HAD vehicle, a ride sharing vehicle, a personal vehicle, a user-driven vehicle, etc. By way of example, the vehicle 101 may be any type of personal vehicle (e.g., a car, a motorcycle, etc.) or any type of transport-capable device (e.g., a bus, a train, a plane, a boat, a drone, etc.).

In step 503, the data processing module 403 processes the environmental sensor data (e.g., image data) to generate a digitized representation of the environment (e.g., the environment around a vehicle 101). In one embodiment, the data processing module 403 processes the image data using a computer vision system to generate the digitized representation. In one instance, the data processing module 403 may process the image data such that it is able to analyze the driving scenario around the vehicle. In one embodiment, the data collection module 401 and/or the data processing module 403 accesses a geographic database (e.g., the geographic database 117) that is not available to a vehicle 101 to generate the digitized representation. By way of example, the geographic database 117 may include image data such as still images, videos, etc. In other words, the data processing module 403 can access environmental sensor data that is unavailable to a vehicle 101 when assembling its own digitized representation of its environment (e.g., via sensor fusion). In one instance, the environmental sensor data and, therefore, the digital representation may include one or more environmental parameters (e.g., day or night, season, weather, outside temperature, etc.).

In step 505, the calculation module 405 calculates a predicted motion of the vehicle based on the digitized representation. By way of example, as described with respect to FIG. 2A, the calculation module 405 can predict that a vehicle 101 will deaccelerate and then stop in response to a red traffic light and conversely will accelerate and then drive in response to a green traffic light. For example, the calculation module 405 can predict that at $T_1$ given the detection of a red traffic light at t=0, the vehicle 101 will stop. In another example, if the digitized representation includes a road lane, the calculation module 405 can predict a vehicle 101 will stay in the lane unless the vehicle is making a turn or changing lanes. In one embodiment, the calculation module 405 can calculate a predicted motion based on the one or more possible vehicle motions given the vehicle 101's environment. For example, the calculation module 405 may calculate a predicted motion based on applicable or relevant street geometry, driving restrictions, parking restrictions, etc. in the environment around the vehicle 101. In one instance, the calculation module 405 can query the street geometry (e.g., road link or segment lengths, road widths, intersections, turns, etc.), driving/parking restrictions (e.g., restricted turns, parking restrictions, etc.), street or path attributes (e.g., speed limits, heading/direction, functional class, number of lanes, etc.) from the geographic database 117 or an equivalent data source.

In step 507, the UI module 407 and/or the data processing module 403 initiates a capture of motion sensor data by a user device (e.g., a UE 109 such as a smartphone), wherein the motion sensor data indicates an observed motion of a vehicle 101 (e.g., an autonomous vehicle). As described above, a UE 109 may be equipped with multi-axial accelerometers, which the data processing module 403 can use to detect and/or observe the vehicle 101's actual movements. In one instance, the motion sensor data may comprise raw sensor readings (e.g., GPS 111 readings). In another instance, the motion sensor data may be localized and/or smoothed to determine the motion of the vehicle 101 within a threshold level of precision (e.g., lane-level localization). A UE 109 may also be equipped with an application 113 that can enable the user to capture motion sensor data (e.g., a camera or video application).

In step 509, the analysis module 409 identifies a safe operation of a vehicle 101 (e.g., an autonomous vehicle) based on a comparison by the user device (e.g., a UE 109) of the observed motion to the predicted motion of the vehicle. In one embodiment, the analysis module 409 identifies the operation of a vehicle 101 as safe when the difference between the observed motion and the predicted motion is determined by the analysis module 409 to be within a tolerance range. By comparison, in one instance, the analysis module 409 identifies the operation of a vehicle 101 as unsafe when the analysis module 409 determines that the difference between the observed motion and the predicted motion is a significant deviation. By way of example, FIG. 2B represents a deviation within a tolerance range relative to FIG. 2A and the FIG. 2C represents a significant deviation relative to FIG. 2A. Consequently, it is contemplated that making the independent verification of the vehicle 101's safe operation accessible and transparent to a potential user will increase the user's confidence and trust that the vehicle 101 and autonomous vehicles in general will perform in a safe manner.

Figure 6:
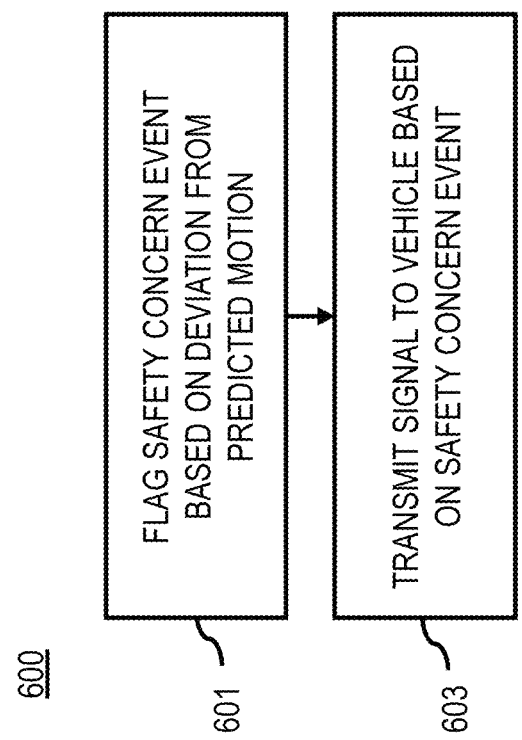
FIG. 6 is a flowchart of a process of flagging a safety concern event associated with a vehicle, according to one embodiment.

FIG. 6 is a flowchart of a process of flagging a safety concern event associated with a vehicle, according to one embodiment. In various embodiments, the verification platform 115 and/or the modules 401-409 may perform one or more portions of the process 600 and may be implemented in, for instance, a chip set including a processor and a memory as shown in FIG. 12. As such, the verification platform 115 and/or any of the modules 401-409, can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

In step 601, the analysis module 409 flags a safety concern event associated with a vehicle 101 based on the analysis module 409 determining that the observed motion deviates from the predicted motion (i.e., a safe motion) by more than a threshold margin. It is contemplated that consumer trust requires that autonomous vehicles perform in a safe manner and if they do not (e.g., a vehicle 101 misinterprets the environment), manufacturers and/or operators are made aware of such events so that they may take corrective steps to reduce and/or to prevent similar unsafe events from reoccurring in the future. In one embodiment, the analysis module 409 can cause the data collection module 401 to store the flagged event in the geographic database 117 for subsequent analysis (e.g., by a manufacturer, a vehicle testing/safety service 123, etc.). In one instance, the analysis module 409 determines a safety concern event based on a vehicle 101 performing at least one of the following actions: (1) ignoring a traffic signal; (2) driving over a road margin; (3) failing to keep in a lane; and (4) failing to react to a behavior of another road user (e.g., another vehicle, a pedestrian, a cyclist, etc.).

In step 603, the data processing module 403 initiates a transmission of a signal from a user device (e.g., a UE 109) to the vehicle 101 (e.g., the vehicle 101 that the UE 109 is traveling within) based on the safety concern event, wherein the signal indicates that the vehicle should re-assess the environment, override a vehicle planned motion, come to a stop, or a combination thereof. As mentioned, consumer trust requires that a vehicle 101 routinely perform in a safe manner. By way of example, the data processing module 403 may initiate a transmission of a signal indicating that a vehicle 101 should discontinue the planned motion and/or come to a stop where the data processing module 403 and/or the calculation module 405 can determine (e.g., based on a likely vehicle trajectory) that the deviation between the predicted motion is likely to increase more than a threshold margin (e.g., in an emergency situation such a blown tire). By way of another example, the data processing module 403 may initiate a transmission of a signal indicating that the vehicle 101 should re-asses the environment where the observed motion deviates from the predicted motion by a minimal amount more than the given threshold margin. For example, if the environment comprises rain or snow, the threshold margin may need to be recalculated by the data processing module 403 to allow for some loss of traction, which may be indicative of an unsafe event in good weather.

Figure 7:
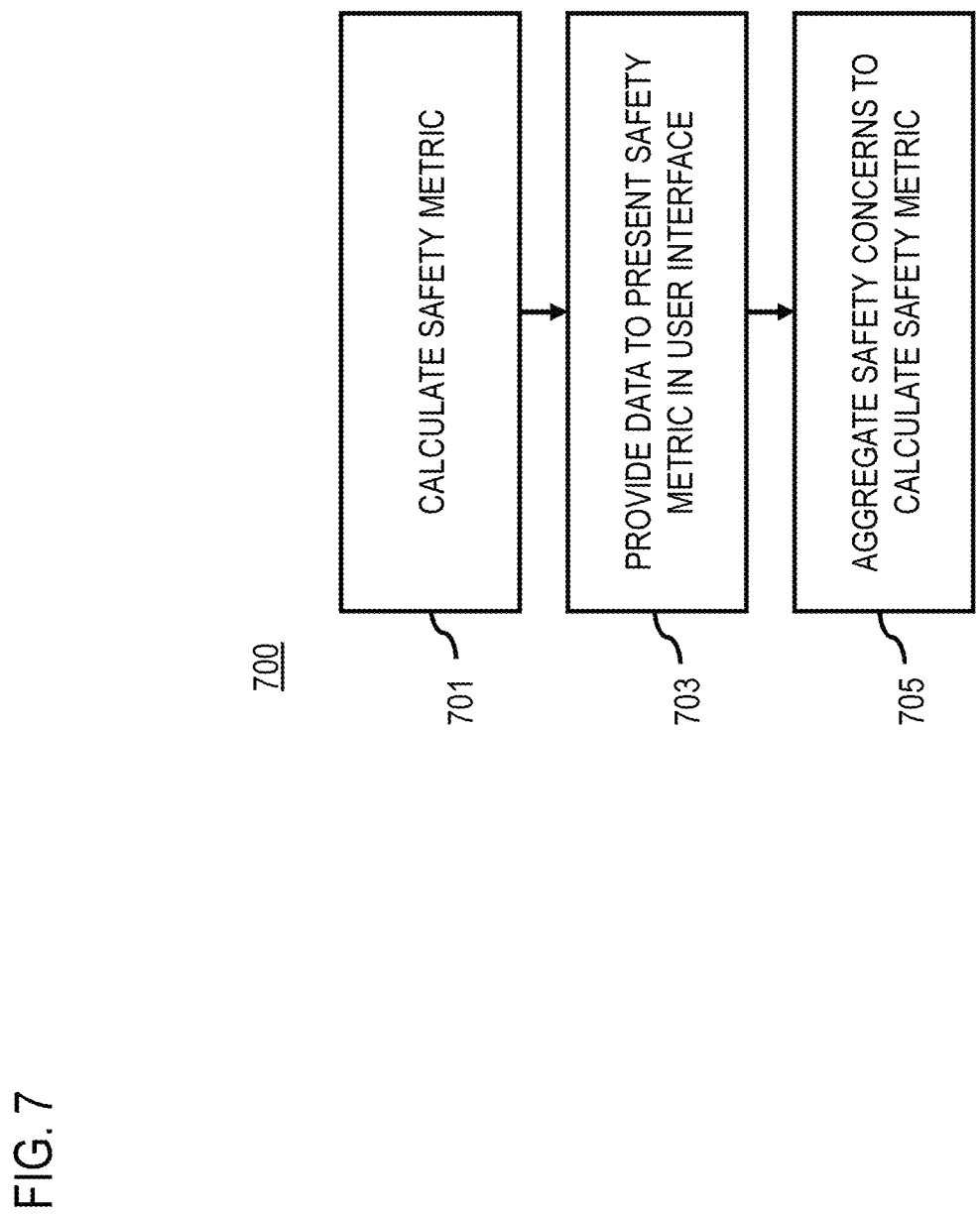
FIG. 7 is a flowchart of a process for calculating a safety metric for a vehicle based on one or more flagged safety concern events, according to one embodiment.

FIG. 7 is a flowchart of a process for calculating a safety metric for a vehicle based on one or more flagged safety concern events, according to one embodiment. In various embodiments, the verification platform 115 and/or the modules 401-409 may perform one or more portions of the process 700 and may be implemented in, for instance, a chip set including a processor and a memory as shown in FIG. 12. As such, the verification platform 115 and/or any of the modules 401-409, can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in connection with the process 600 in any order or combination and need not include all of the illustrated steps. That is in one embodiment, a safety metric can be calculated for a vehicle 101 based on one or more flagged safety concern events according to the embodiments of the process 600 described above.

In step 701, the calculation module 405 calculates a safety metric for a vehicle 101 (e.g., an autonomous vehicle) based on a safety concern event, one or more previously flagged safety concern events, or a combination thereof. In one embodiment, the safety metric is calculated by the calculation module 405 with respect to the vehicle 101, a make of the vehicle 101, an operator of the vehicle 101 (e.g., a trained technician or an inexperienced passenger), or a combination thereof. By way of example, the safety metric may identify how the vehicle 101 performs in critical situations. In one instance, the safety metric may be used by a user to select a vehicle 101 for a ride service (e.g., an autonomous taxi service). For example, the user may select one vehicle 101 over another vehicle 101 based on the respective safety scores of the vehicles 101. By way of example, in some instances, a user may only want to board a vehicle 101 that has the highest safety score (e.g., when traveling with kids) and in other instances (e.g., a short trip around the corner), the user may be less concerned with a vehicle 101's safety score.

In one embodiment, the calculation module 405 may calculate the safety metric based on one or more quantitative parameters, one or more qualitative parameters, or a combination thereof. By way of example, the calculation module 405 may calculate the safety metric based on the number of trips or travels that a vehicle 101 has completed relative to the number of flagged safety concern events associated with the vehicle 101. In another instance, the calculation module 405 may calculate the safety metric based on the number of unique flagged safety concern events compared to the number of repeatedly flagged safety concern events within a period or over the life of the vehicle 101. The calculation module 405 may calculate the safety metric, in one instance, based on the type or the specific safety concern event that was flagged. In other words, in one instance, the calculation module 405 may calculate the safety metric based on a weighing of the safety concern events. For example, in some instances, the calculation module 405 may assign less weight to a vehicle 101 flagged for driving over a road margin relative to a vehicle 101 that ignored a traffic signal or failed to keep in a lane. In one embodiment, the calculation module 405 may calculate the safety metric with respect to the vehicle 101, a make of the vehicle 101, an operator of the vehicle 101, or a combination thereof. For example, a safety score of one vehicle 101 make may be different numerically than a safety score of a vehicle 101 of a different make but similar qualitatively.

Figure 9A:
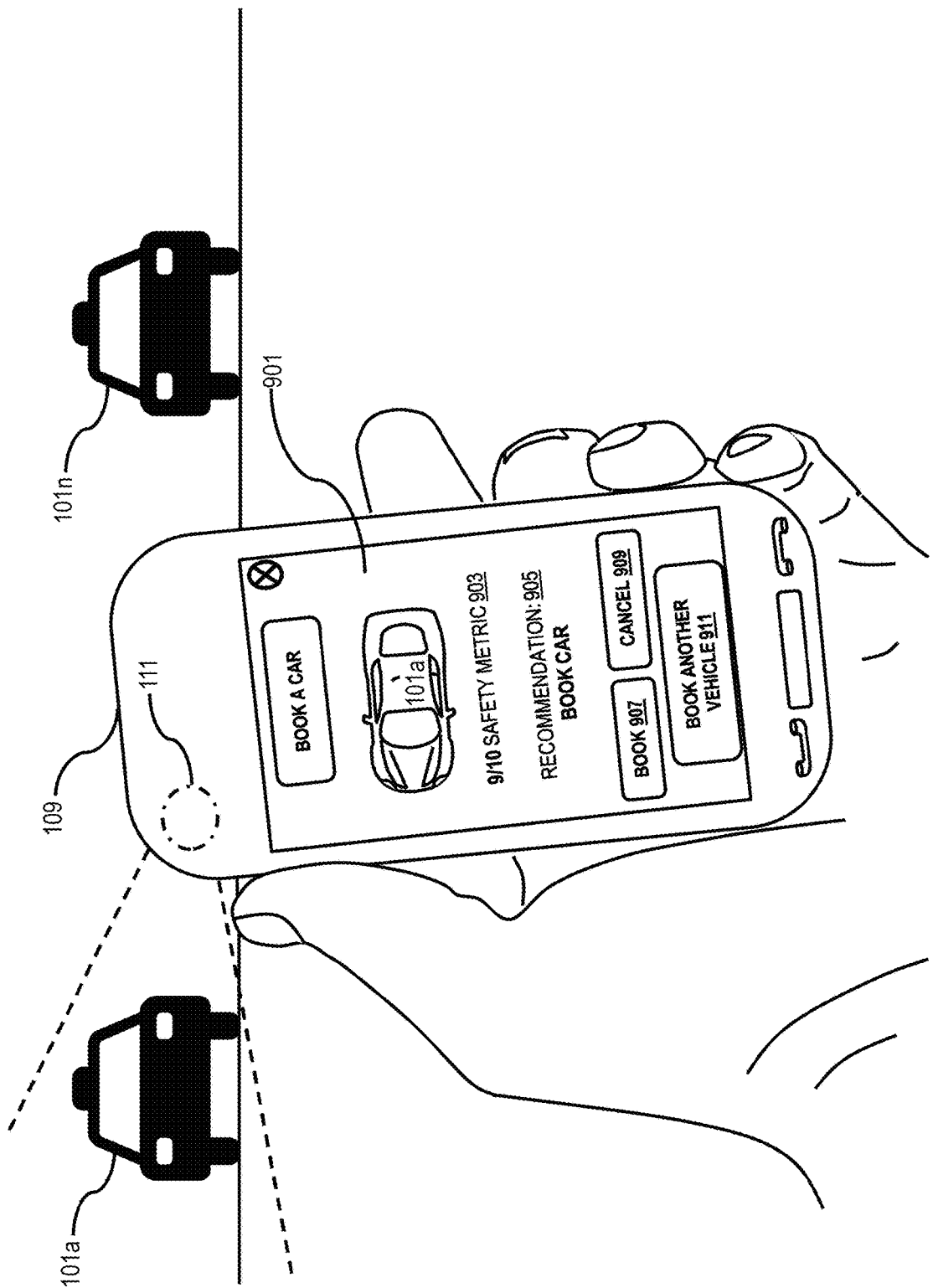
FIGS. 9A and 9B are diagrams of example user interfaces for presenting a safety metric of a vehicle to a user, according to one embodiment.
Figure 9B:
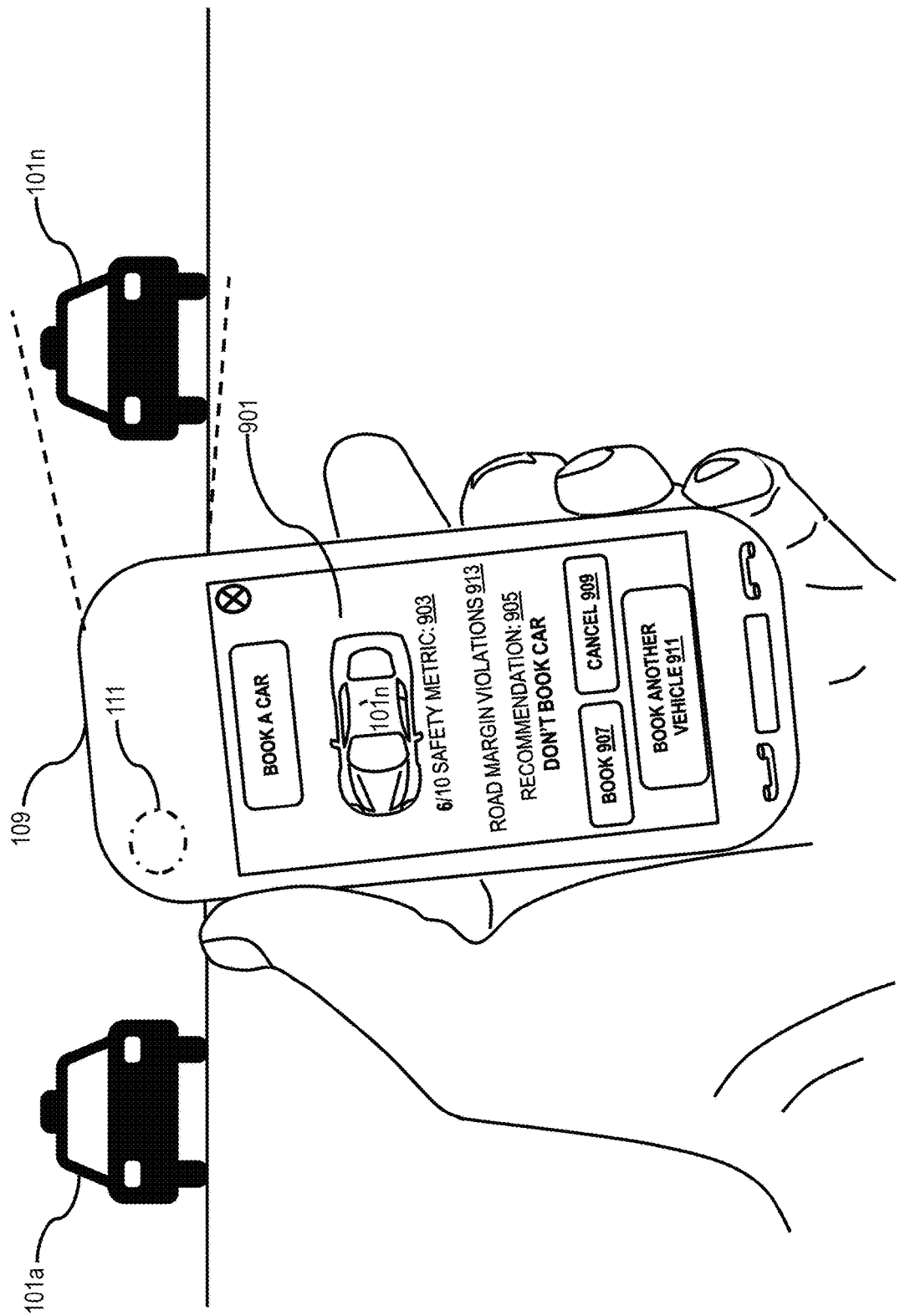

In step 703, the data processing module 403 provides data to present a representation of the safety metric in a user interface to a user. By way of example, the data processing module 403 in connection with the UI module 407 can present a safety metric (e.g., a safety score) associated with a vehicle 101 in an application 113 (e.g., an autonomous taxi application) associated with a UE 109 (e.g., a mobile device), as depicted in FIGS. 9A and 9B. In one embodiment, the representation may be any visual, graphic, or numerical representation by which a user can efficiently decide whether a vehicle 101 is safe and/or compare one vehicle 101 against one or more other vehicles 101. In one embodiment, the representation may consist of a single safety metric (e.g., a composite score) or the representation may consist of a safety score and its various components. For example, two vehicles 101 may have the same safety score but one vehicle's score may be based on the vehicle 101 ignoring a traffic signal once and another vehicle's score may be based on the vehicle 101 driving over a road margin two times.

In step 705, the data collection module 401 aggregates the safety concern event, the one or more previously flagged safety concern events, or a combination thereof from a plurality of users to calculate the safety metric. In one embodiment, the data collection module 401 can aggregate and/or access the one or more safety concern events associated with a vehicle 101 (e.g., stored in the geographic database 117) based on one or more unique identifying features of the vehicle 101 such as, but not limited to, a license plate number, a service provider name plus a VIN or one or more unique visible features (e.g., a logo, a sticker, a marking, etc.), an IP address for the vehicle 101, network adapter MAC address(es)(for electronic communications), etc. In one embodiment, the data processing module 403 can convert the aggregated safety concern events into a metric or a rating for a vehicle 101 so that the data processing module 403 may provide a subsequent user of the vehicle 101 an aggregated assessment of the vehicle's operational safety (e.g., via a UE 109) prior to the user boarding/booking the vehicle 101 (e.g., in step 703). In one instance, the data collection module 401 may aggregate safety concern events across multiple vehicles 101 of multiple fleets (e.g., an autonomous taxi fleet). In one embodiment, the data collection module 401 in connection with the data processing module 403 can cause the aggregated safety concern events to be kept or stored in the geographic database 117 by an independent party (e.g., a service 123, a data source 119, or a combination thereof) to minimize risk of manipulation by the vehicle's manufacturer or operator.

Figure 8A:
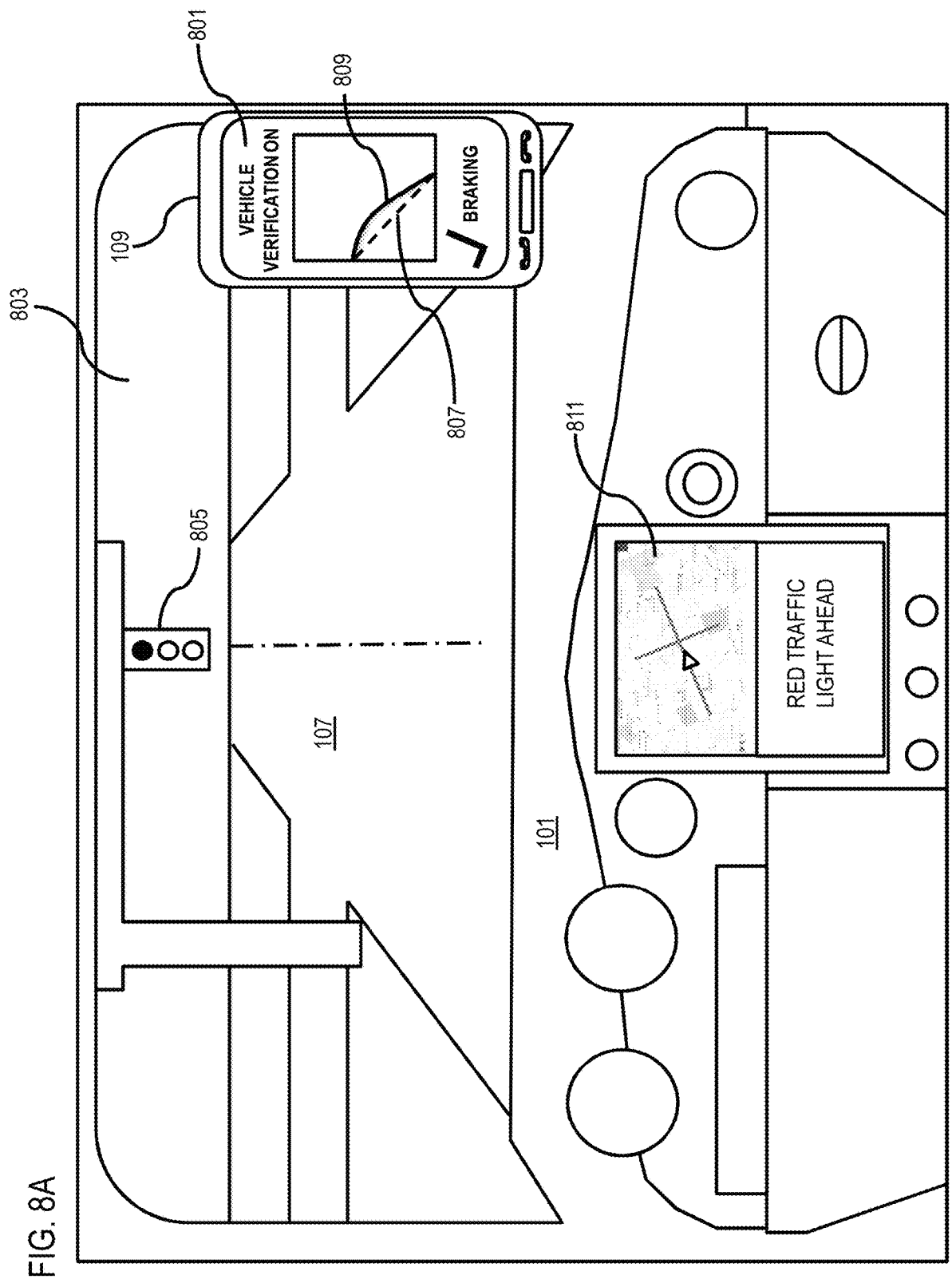
FIGS. 8A and 8B are diagrams of example user interfaces for verifying a safe operation of a vehicle via a portable device, according to one embodiment.
Figure 8B:
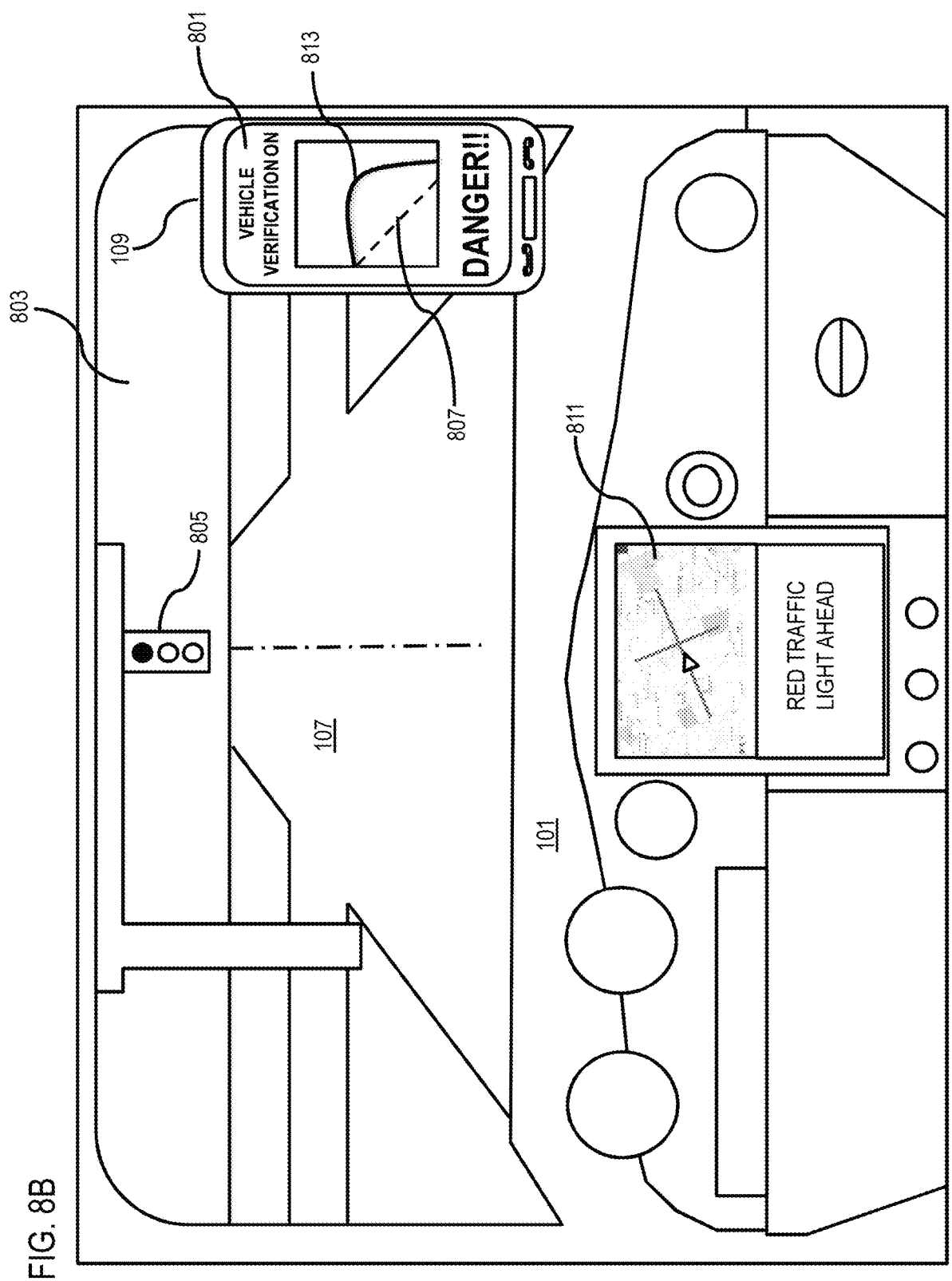

FIGS. 8A and 8B are diagrams of example user interfaces for verifying a safe operation of a vehicle (e.g., an autonomous vehicle 101) via a portable device (e.g., a UE 109), according to one embodiment. The examples of FIGS. 8A and 8B generally follow the examples described above with respect to FIGS. 2A and 2C, respectively. As shown, a mobile device 109 (e.g., a smart phone) includes a UI 801 (e.g. an application 113) indicating "vehicle verification on." Specifically, the mobile device 109 is attached to the windshield 803 of the autonomous vehicle 101 that is traveling on the road 107 of the travel network 105. In this example, one or more device sensors 111 of the mobile device (e.g., a rear-facing camera) can capture environmental sensor data relative to the autonomous vehicle 101 (e.g., an approaching traffic light 805). In this instance, the traffic light 805 is red. In one embodiment, the mobile device 109 can predict that the autonomous vehicle 101 will deaccelerate and stop in a steady manner based on its detection of the red light 805. In this example, the graph line 807 represents the predicted motion profile of the vehicle 101. For example, the detection of the red light 805 by the mobile device 109 occurs at t=0, then at $T_1$, the autonomous vehicle 101 is predicted to stop (e.g., by engaging its braking system).

In one embodiment, the mobile device 109 can also detect or observe (e.g., using one or more device sensors 111) the motion profile of the vehicle 101 between t=0 and $T_1$, as depicted by the graph line 809. While there may be a difference between the predicted motion profile (graph line 807) and the detected motion profile (graph line 809), the mobile device 109 can determine that the autonomous vehicle 101 operated in this instance as expected and/or within a tolerance range (e.g., "braking 'check'"). In one embodiment, the mobile device 109 may project the UI 801, the graph lines 807 and 809, or a combination thereof onto the windshield 803 of the autonomous vehicle 101 (e.g., via a heads-up-display). In one embodiment, the UI 801 may include or be associated with an augmented reality (AR) and/or two-dimensional (2D)/three-dimensional (3D) view or display for such purposes. In one embodiment, the mobile device 109 may interact with another UE 109 associated with the autonomous vehicle 101 (e.g., an embedded navigation system 811) to provide additional context and/or environmental information to the user.

Referring to FIG. 8B, in this instance, the autonomous vehicle 101 has failed to detect the red traffic light 805 (e.g., at t=0). Consequently, the motion profile 813 detected by the mobile device 109 represents a significant deviation relative to the predicted motion profile 807 and the detected motion profile 809 of FIG. 8A, which indicates to the mobile device 109 that the autonomous vehicle 101 has either executed a late braking maneuver or may have even crashed (e.g., "danger! !"). In one embodiment, such incidents would be reported by the mobile device 109 (e.g., to a manufacturer) as a safety-critical event that the autonomous vehicle 101 may have missed.

FIGS. 9A and 9B are diagrams of example user interfaces for presenting a safety metric of a vehicle 101 (e.g., an autonomous vehicle) to a user (e.g., a passenger or operator), according to one embodiment. In this example, a user may want to book an autonomous taxi service and, therefore, may want to know which of the autonomous vehicles 101 (e.g., vehicle 101a or vehicle 101n) performs better in critical situations.

In one embodiment, a user may initiate a booking of an autonomous vehicle 101 (e.g., vehicle 101a or vehicle 101n) by using the user interface 901 (e.g., an AR application 113) on the mobile device 109. In one instance, as the user initiates a booking of a vehicle 101 by clicking on a 'book a car' button, the user interface 901 may display the vehicle 101 and its safety metric 903. For example, when a user aims or points a rear-facing camera 111 of the mobile device 109 at the vehicles 101a (FIG. 9A) and 101n (FIG. 9B), the UI 901 presents the safety metric 903 of each autonomous vehicle 101 to the user. In one embodiment, the UI 901 may present the vehicles 101a and 101n according to their safety metric 903 (e.g., safest vehicle 101 first) so that a user would have the option of getting the safest vehicle 101 (e.g., vehicle 101a) while still be able to book one. In one instance, the UI 901 may filter out vehicles 101 are below a user-predefined safety ranking threshold (e.g., vehicle 101n) and, therefore, not presented to the user or presented with a warning (e.g., "don't book car"). In one instance, the UI 901 can include an image and/or identification of the autonomous vehicle 101 so that the user can make certain that she or he is obtaining accurate safety information.

In one embodiment, once the mobile device 109 identifies the autonomous vehicle 101 (e.g., vehicle 101a), the mobile device 109 can determine the safety metric 903 of the autonomous vehicle 101 by comparing the observed motion profile of the vehicle to its corresponding predicted motion profile. In one embodiment, the mobile device 109 can access motion sensor data obtained from a UE 109 associated with the vehicle 101a (e.g., that recently traveled in the vehicle 101a) and stored in the geographic database 117. In this example, the mobile device 109 determines based on the comparison of the predicted and observed motion profiles that the vehicle 101a has operated as expected and/or within a tolerance range (e.g., a safe tolerance range). Consequently, the safety metric 903 is represented in the UI 901 as a "9/10." In addition, a recommendation 905 ("book car") is displayed on the user interface 901. In other words, in this instance, the user can trust and/or have confidence that the autonomous vehicle 101a will perform in a safe manner. In one embodiment, the user may proceed to book the autonomous vehicle 101a by clicking on a 'book' button 907, or she or he may cancel the booking by clicking on a 'cancel' button 909. In the case where the user cancels the booking, (e.g., if the vehicle 101 has a low safety metric 903 or a lower than desired safety metric 903), then the user can book another vehicle 101 by clicking on the 'book another vehicle' button 911. In one embodiment, the UI 901 may present the next bookable vehicle 101, ranked according to their safety metric 903. In this instance, the UI 901 would present the vehicle 101n.

In one embodiment, the user may have previously configured the UI 901 so that if the user clicks the "book another vehicle" button 911, the UI 901 will only present vehicles 101 that have not yet been assessed and will disregard vehicles 101 from the search that have been previously rejected due to a low or insufficient safety metric 903 (e.g., vehicle 101*n*). Similarly, the user may have previously configured the UI 901 to filter out vehicles 101 that are below a predefined safety ranking threshold. This can prevent duplicated results for users that do not wish to book a vehicle 101 with a low safety metric.

FIG. 9B is like FIG. 9A; however, in this instance, the user aims or points the rear-facing camera 111 of the mobile device 109 at the autonomous vehicle 101*n* instead of the autonomous vehicle 101*a*. Again, once the mobile device 109 identifies the autonomous vehicle 101 (e.g., vehicle 101*n*), the mobile device 109 can determine the safety metric 903 of the autonomous vehicle 101 by comparing the observed motion profile of the vehicle to its corresponding predicted motion profile. In this instance, the mobile device 109 determines based on the comparison of the predicted and observed motion profiles that the autonomous vehicle 101*n* has not operated as expected and/or within a tolerance range (e.g., a safe tolerance range). For example, a safety concern event 913 was flagged (e.g., by another UE 109 that recently traveled in the vehicle 101*n*) based on the vehicle 101*n* driving over a road margin. In one instance, the mobile device 109 may be able to identify that the vehicle 101*n* was flagged by more than one UE 109 for driving over a road margin. Consequently, the safety metric 903 is represented in the UI 901 as a "6/10." In addition, a recommendation 905 ("don't book car") is displayed on the user interface 901. In other words, in this instance, the user should not trust or have confidence that the autonomous vehicle 101*n* will perform in a safe manner and/or the user can quickly appreciate that the vehicle 101*a* is the safer of the two vehicles 101. It is contemplated that in some instances, a user may want to override the recommendation 905 based on the specific flagged safety concern event 913. For example, if a user just needs the autonomous vehicle 101*n* to go around the block, they may be less concerned with one or more flagged road margin violations. As described above, in some instances, the user may decide whether to board/book the vehicle 101 based on the type of safety concern event 913 that was flagged. Consequently, the user may still proceed to book the autonomous vehicle 101*n* by clicking on a 'book' button 907, or she or he may cancel the booking by clicking on a 'cancel' button 909. In this example, the 'book another vehicle' button 911 can be helpful to the user. As mentioned above, in one embodiment, the UI 901 may present the next bookable vehicle 101, ranked according to their safety metric 903. In this instance; however, there are no other vehicles 101 available.

Again, in one embodiment, the user may have previously configured the UI 901 so that if the user clicks the "book another vehicle" button 911, the UI 901 will only present vehicles 101 that have not yet been assessed and will disregard vehicles that have been previously rejected due to a low or insufficient safety metric 903. Again, the user may have also previously configured the UI 901 to filter out vehicles 101 that are below a predefined safety ranking threshold. Consequently, depending on the configuration of the UI 901, the vehicle 101*n* may be disregarded with respect to the "book another vehicle" 911 search feature.

Returning to FIG. 1, in one embodiment, the UEs 109 can be associated with any of the vehicles 101 or a person traveling within a vehicle 101. By way of example, the UEs 109 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 109 can support any type of interface to the user (such as "wearable" circuitry, etc.). In one embodiment, the one or more vehicles 101 may have cellular or wireless fidelity (Wi-Fi) connection either through the inbuilt communication equipment or from a UE 109 associated with the vehicles 101. Also, the UEs 109 may be configured to access the communication network 127 by way of any known or still developing communication protocols. In one embodiment, the UEs 109 may include the verification platform 115 to verifying a safe operation of a vehicle 101.

In one embodiment, the UEs 109 may include device sensors 111 (e.g., a front facing camera, a rear facing camera, GPS sensors, multi-axial accelerometers, height sensors, tilt sensors, moisture sensors, pressure sensors, etc.) and applications 113 (e.g., a mapping application, a navigation application, a parking application, a diagnostic application, etc.) to predict and detect respective motion profiles of a vehicle 101 (e.g., an autonomous vehicle) that a UE 109 is traveling within (e.g., mounted to a windshield).

By way of example, the verification platform 115 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. In one embodiment, the verification platform 115 may be a platform with multiple interconnected components. The verification platform 115 may include multiple servers, intelligent networking devices, computing devices, components and corresponding software for providing assessment about a vehicle. In addition, it is noted that the verification platform 115 may be a separate entity of the system 100, a part of the services platform 121, the one or more services 123, or a data source 119. It is also contemplated that the verification platform 115 can support any type of interface to the user.

In one embodiment, data sources 119*a*-119*m* (collectively referred to as data sources 119) may provide content or data (e.g., operational data, environmental data, navigation data, etc.) to the UEs 109, the verification platform 115, the geographic database 117, the services platform 121, the services 123, and the vehicles 101. The content provided may be any type of content, such as textual content, audio content, video content, image content, etc. In one embodiment, the data sources 119 may provide data that may aid in detecting and classifying operational parameters into critical and/or non-critical operational status. In one embodiment, the data sources 119 may also store content associated with the UEs 109, the verification platform 115, the services platform 121, services 123, and/or vehicles 101. In another embodiment, the data sources 119 may manage access to a central repository of data, and offer a consistent, standard interface to data, such as a repository of the geographic database 117.

In one embodiment, the vehicles 101 are configured with various vehicle sensors 103 for collecting operational data, vehicular sensor data, related geographic/map data, etc. In one embodiment, the sensed data represent sensor data associated with a geographic location or coordinates at which the sensor data was collected. By way of example, the vehicle sensors 103 may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of vehicle sensors 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In one scenario, the sensors may detect weather data, traffic information, or a combination thereof. In one embodiment, the vehicle 101 may include GPS or other satellite-based receivers to obtain geographic coordinates from satellites 125 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 127 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the UEs 109, the applications 113, the verification platform 115, the data sources 119, the services platform 121, the services 123, and/or the vehicles 101 communicate with each other and other components of the system 100 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
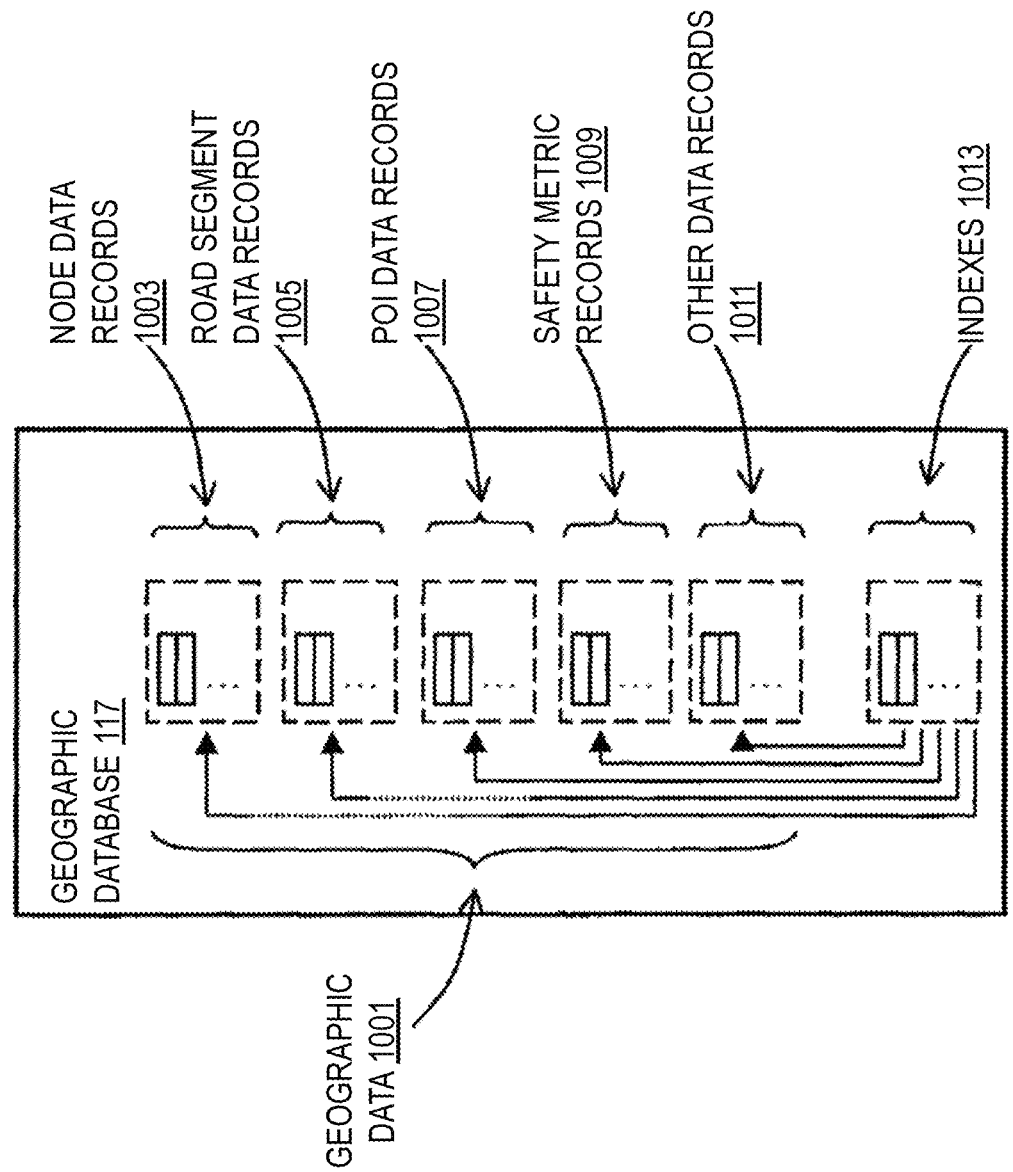
FIG. 10 is a diagram of a geographic database, according to one embodiment.

FIG. 10 is a diagram of a geographic database, according to one embodiment. In one embodiment, the geographic database 117 includes geographic data 1001 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 117.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 117 follows certain conventions. For example, links do not cross themselves and do not cross each other except at a node. Also, there are no duplicated shape points, nodes, or links. Two links that connect each other have a common node. In the geographic database 117, overlapping geographic features are represented by overlapping polygons. When polygons overlap, the boundary of one polygon crosses the boundary of the other polygon. In the geographic database 117, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 117 includes node data records 1003, road segment or link data records 1005, POI data records 1007, safety metric records 1009, other records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the geographic database 117. In one embodiment, the indexes 1013 may be used to quickly locate data without having to search every row in the geographic database 117 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of a predicted motion profile of vehicle 101. The node data records 1003 are end points corresponding to the respective links or segments of the road segment data records 1005. The road link data records 1005 and the node data records 1003 represent a road network, such as used by vehicles (e.g., autonomous vehicles), cars, and/or other entities. Alternatively, the geographic database 117 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 117 can include data about the POIs and their respective locations in the POI data records 1007. The geographic database 117 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 117 can also include safety metric records 1009 for verifying a safe operation of a vehicle (e.g., an autonomous vehicle). In one embodiment, the safety metric records 1009 can be based on a vehicle, a make of the vehicle, an operator of the vehicle, or a combination thereof. In one embodiment, the safety metric records 1009 may aggregated from detected motion profiles and provided as an aggregated score for a user that is about to board/book a ride with the vehicle.

In one embodiment, the safety metric records 1009 can be associated with one or more of the node records 1003, road segment records 1005, and/or POI data records 1007; or portions thereof (e.g., smaller or different segments than indicated in the road segment records 1005, individual lanes of the road segments, etc.) to provide situational awareness to drivers to enable them to potentially trust and have confidence that the vehicle will perform in a safe manner.

In one embodiment, the geographic database 117 can be maintained by the data sources 119 or content providers (not shown) in association with the services platform 121 (e.g., vehicle rental shops, taxi service providers, etc.). In one embodiment, the service provider 121 may be a map developer to collect geographic data to generate and enhance the geographic database 117. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

In one embodiment, the geographic database 117 includes high resolution or high definition (HD) mapping data that provide centimeter-level or better accuracy of map features. For example, the geographic database 117 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 117 is stored as a hierarchical or multi-level tile-based projection or structure. More specifically, in one embodiment, the geographic database 117 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

The geographic database 117 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for verifying a safe operation of a vehicle via a portable device may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
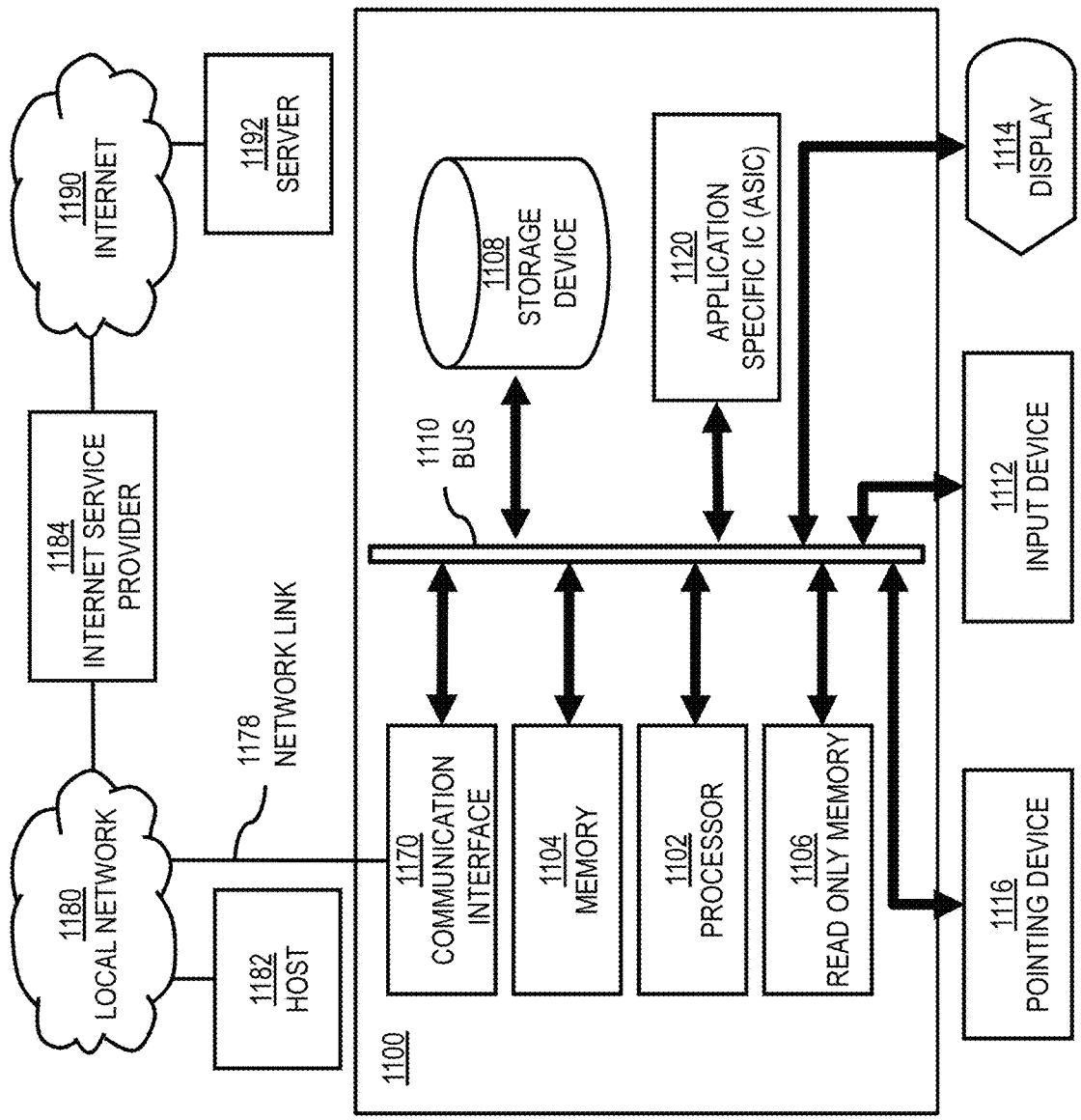
FIG. 11 is a diagram of hardware that can be used to implement an embodiment.

FIG. 11 illustrates a computer system 1100 upon which an embodiment may be implemented. Computer system 1100 is programmed (e.g., via computer program code or instructions) to verify a safe operation of a vehicle via a portable device as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to assess operational and safety conditions of a vehicle. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random-access memory (RAM) or other dynamic storage device, stores information including processor instructions for verifying a safe operation of a vehicle via a portable device. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for verifying a safe operation of a vehicle via a portable device, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 119 for verifying a safe operation of a vehicle via a portable device.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment may be implemented. Chip set 1200 is programmed to verify a safe operation of a vehicle via a portable device as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to verify a safe operation of a vehicle via a portable device. The memory 1205 also stores the data associated with or generated by the execution of the inventive steps.

Figure 13:
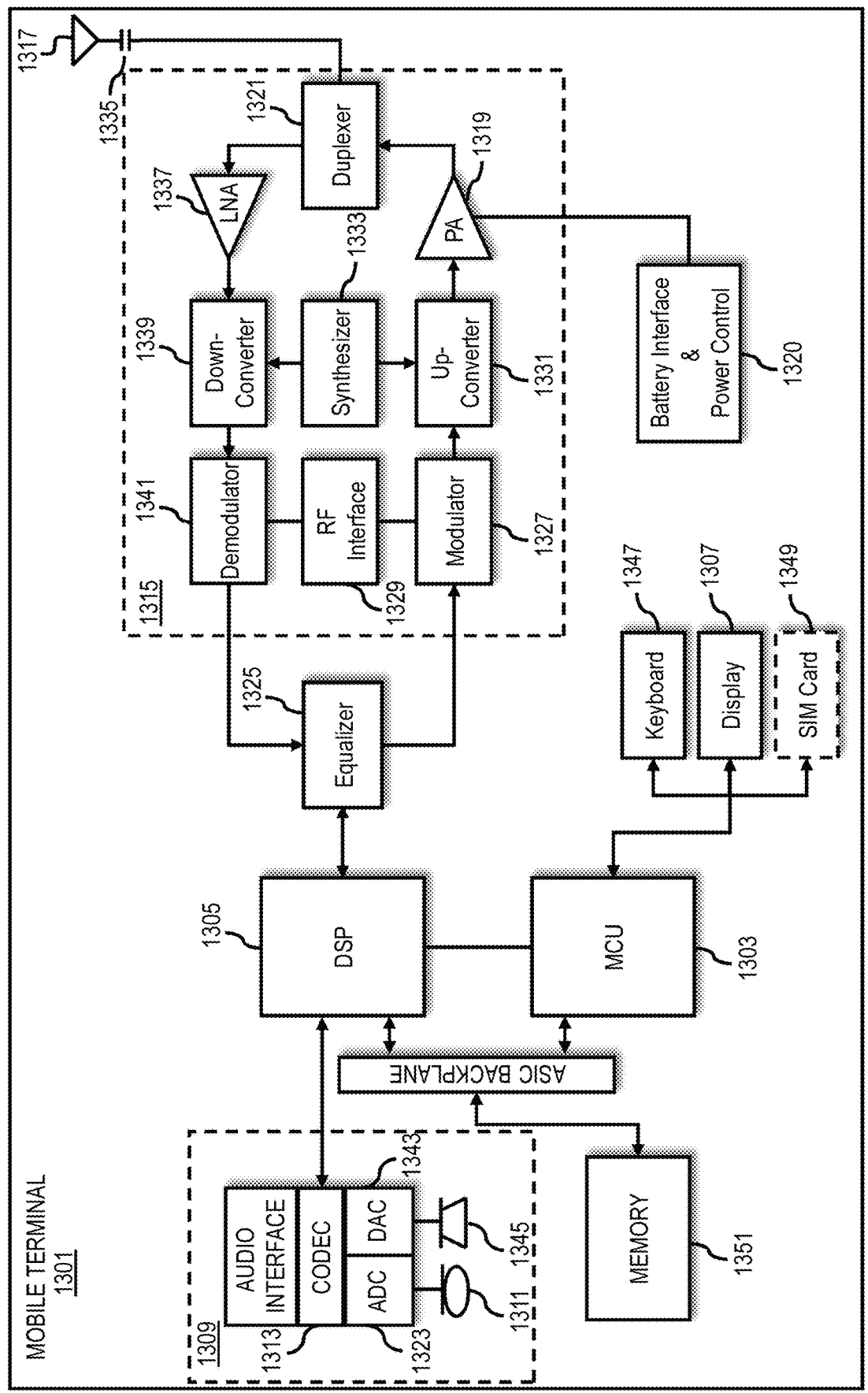
FIG. 13 is a diagram of a mobile terminal (e.g., handset or vehicle or part thereof) that can be used to implement an embodiment.

FIG. 13 is a diagram of exemplary components of a mobile terminal 1301 (e.g., handset, vehicle or part thereof, etc.) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to verify a safe operation of a vehicle via a portable device. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
initiating a capture of environmental sensor data by a user device, wherein the sensor data indicates at least a partial view of an environment around a vehicle, and wherein the user device is independent of the vehicle;
processing the environmental sensor data to generate a digitized representation of the environment;
calculating a predicted motion of the vehicle based on the digitized representation;
initiating a capture of motion sensor data by the user device, wherein the motion sensor data indicates an observed motion of the vehicle; and
identifying a safe operation of the vehicle based on a comparison by the user device of the observed motion to the predicted motion of the vehicle.

2. The method of claim 1, further comprising:
flagging a safety concern event associated with the vehicle based on the user device determining that the observed motion deviates from the predicted motion by more than a threshold margin.

3. The method of claim 2, wherein the safety concern event includes at least one of:
the vehicle ignoring a traffic signal;
the vehicle driving over a road margin;
the vehicle failing to keep in a lane; and
the vehicle failing to react to a behavior of another road user.

4. The method of claim 2, further comprising:
initiating a transmission of a signal from the user device to the vehicle based on the safety concern event,
wherein the signal indicates that the vehicle should reassess the environment, override a vehicle planned motion, come to a stop, or a combination thereof.

5. The method of claim 2, further comprising:
calculating a safety metric for the vehicle based on the safety concern event, one or more previously flagged safety concern events, or a combination thereof; and
providing data to present a representation of the safety metric in a user interface to a user.

6. The method of claim 5, further comprising:
aggregating the safety concern event, the one or more previously flagged safety concern events, or a combination thereof from a plurality of users to calculate the safety metric.

7. The method of claim 5, wherein the safety metric is calculated with respect to the vehicle, a make of the vehicle, an operator of the vehicle, or a combination thereof.

8. The method of claim 1, wherein the environmental sensor data includes image data captured from an image sensor of the user device, an entity external to the vehicle, or a combination thereof; the method further comprising:
processing the image data using a computer vision system to generate the digitized representation.

9. The method of claim 1, wherein the user device accesses a geographic database that is not available to the vehicle to generate the digitized representation.

10. The method of claim 1, wherein the vehicle is an autonomous vehicle, and wherein the user device is carried by a passenger of the autonomous vehicle and is mounted to the autonomous vehicle during a trip by the passenger.

11. An apparatus comprising:
at least one processor; and
at least one memory including computer program code for one or more programs,
the at least one memory and the computer program code configured to, with the at least one processor, cause the apparatus to perform at least the following,
initiate a capture of environmental sensor data by the apparatus, wherein the sensor data indicates at least a partial view of an environment around a vehicle, and wherein the apparatus is independent of the vehicle;
process the environmental sensor data to generate a digitized representation of the environment;
calculate a predicted motion of the vehicle based on the digitized representation;
initiate a capture of motion sensor data by the apparatus, wherein the motion sensor data indicates an observed motion of the vehicle; and
identify a safe operation of the vehicle based on a comparison of the observed motion to the predicted motion of the vehicle.

12. The apparatus of claim 11, wherein the apparatus is further caused to:
flag a safety concern event associated with the vehicle based on determining that the observed motion deviates from the predicted motion by more than a threshold margin.

13. The apparatus of claim 12, wherein the safety concern event includes at least one of:
the vehicle ignoring a traffic signal;
the vehicle driving over a road margin;
the vehicle failing to keep in a lane; and
the vehicle failing to react to a behavior of another road user.

14. The apparatus of claim 12, wherein the apparatus is further caused to:
initiate a transmission of a signal from the apparatus to the vehicle based on the safety concern event,
wherein the signal indicates that the vehicle should reassess the environment, override a vehicle planned motion, come to a stop, or a combination thereof.

15. The apparatus of claim 12, wherein the apparatus is further caused to:
calculate a safety metric for the vehicle based on the safety concern event, one or more previously flagged safety concern events, or a combination thereof; and
provide data to present a representation of the safety metric in a user interface to a user.

16. A non-transitory computer-readable storage medium carrying one or more sequences of one or more instructions which, when executed by one or more processors, cause an apparatus to perform:
initiating a capture of environmental sensor data by the apparatus, wherein the sensor data indicates at least a partial view of an environment around a vehicle, and wherein the apparatus is independent of the vehicle;
processing the environmental sensor data to generate a digitized representation of the environment;
calculating a predicted motion of the vehicle based on the digitized representation;
initiating a capture of motion sensor data by the apparatus, wherein the motion sensor data indicates an observed motion of the vehicle; and
identifying a safe operation of the vehicle based on a comparison of the observed motion to the predicted motion of the vehicle.

17. The non-transitory computer-readable storage medium of claim 16, wherein the apparatus is caused to further perform:

flagging a safety concern event associated with the vehicle based on determining that the observed motion deviates from the predicted motion by more than a threshold margin.

18. The non-transitory computer-readable storage medium of claim 17, wherein the safety concern event includes at least one of:

the vehicle ignoring a traffic signal;

the vehicle driving over a road margin;

the vehicle failing to keep in a lane; and the vehicle failing to react to a behavior of another road user.

19. The non-transitory computer-readable storage medium of claim 17, wherein the apparatus is caused to further perform:

initiating a transmission of a signal from the apparatus to the vehicle based on the safety concern event, wherein the signal indicates that the vehicle should re-assess the environment, override a vehicle planned motion, come to a stop, or a combination thereof.

20. The non-transitory computer-readable storage medium of claim 17, wherein the apparatus is caused to further perform:

calculating a safety metric for the vehicle based on the safety concern event, one or more previously flagged safety concern events, or a combination thereof; and providing data to present a representation of the safety metric in a user interface to a user.

\* \* \* \* \*